(12) United States Patent
Patel et al.

(10) Patent No.: US 10,990,605 B2
(45) Date of Patent: Apr. 27, 2021

(54) INSTANCE DATA REPLICATION

(71) Applicant: ServiceNow, Inc., Santa Clara, CA (US)

(72) Inventors: Swapnesh Patel, Bothell, WA (US); Krishna Chaitanya Thota, Santa Clara, CA (US); Rao Subrahmanyeswara Surapaneni, San Jose, CA (US); Scott Michael Stone, Snohomish, WA (US); Naga Padmaja Vattikuti, Fremont, CA (US); Jude Ian McQuaid, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 177 days.

(21) Appl. No.: 15/940,489

(22) Filed: Mar. 29, 2018

(65) Prior Publication Data

US 2019/0266276 A1 Aug. 29, 2019

Related U.S. Application Data

(60) Provisional application No. 62/635,228, filed on Feb. 26, 2018.

(51) Int. Cl.
*G06F 16/27* (2019.01)
*G06F 16/23* (2019.01)

(52) U.S. Cl.
CPC .......... *G06F 16/27* (2019.01); *G06F 16/2358* (2019.01); *G06F 16/2365* (2019.01); *G06F 16/2379* (2019.01); *G06F 16/23* (2019.01)

(58) Field of Classification Search
CPC ...................................................... F06F 16/27
USPC ......................................................... 707/610
See application file for complete search history.

(56) References Cited

U.S. PATENT DOCUMENTS

| | | | |
|---|---|---|---|
| 7,020,706 B2 | 3/2006 | Cates | |
| 7,191,284 B1 * | 3/2007 | Gupta | ................. G06F 11/2064 711/114 |
| 7,716,353 B2 | 5/2010 | Golovinsky | |
| 7,769,718 B2 | 8/2010 | Murley | |
| 7,925,981 B2 | 4/2011 | Pourheidari | |
| 8,402,127 B2 | 3/2013 | Solin | |
| 8,612,408 B2 | 12/2013 | Trinon | |

(Continued)

*Primary Examiner* — Syling Yen
(74) *Attorney, Agent, or Firm* — Fletcher Yoder PC

(57) ABSTRACT

A method for replicating instance data includes: detecting, based on producer instance replication configuration data, a data modification event associated with a record of a replication target table included in a replication set of the producer instance; generating replication event data of the data modification event when the data modification event is determined to be eligible for replication based on predetermined criteria included in the producer replication configuration data; placing the encrypted replication event data on an outbound replication queue to transport the replication event data to a logging infrastructure for replication; reading, at a consumer instance subscribing to the replication set of the producer instance, the replication event data from the logging infrastructure based on consumer instance replication configuration data; and loading a record onto a replication destination table of the consumer instance based on the read replication event data.

20 Claims, 7 Drawing Sheets

(56) References Cited

U.S. PATENT DOCUMENTS

| | | | |
|---|---|---|---|
| 8,677,451 B1* | 3/2014 | Bhimaraju | H04L 63/083 |
| | | | 726/2 |
| 8,832,652 B2 | 9/2014 | Mueller | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 7/2016 | Mueller | |
| 9,396,242 B2 | 7/2016 | Varley et al. | |
| 9,535,737 B2 | 1/2017 | Joy | |
| 9,645,833 B2 | 5/2017 | Mueller | |
| 9,654,833 B2 | 5/2017 | Mueller | |
| 9,766,935 B2 | 9/2017 | Kelkar | |
| 9,805,322 B2 | 10/2017 | Kelkar | |
| 10,320,843 B1* | 6/2019 | Dobrek | H04L 63/18 |
| 2005/0076099 A1* | 4/2005 | Wang | H04L 29/06027 |
| | | | 709/219 |
| 2011/0099342 A1* | 4/2011 | Ozdemir | G06F 11/2074 |
| | | | 711/162 |
| 2012/0259894 A1* | 10/2012 | Varley | G06F 16/27 |
| | | | 707/795 |
| 2013/0159249 A1* | 6/2013 | Dewall | G06F 11/1662 |
| | | | 707/610 |
| 2016/0048408 A1* | 2/2016 | Madhu | G06F 11/2023 |
| | | | 718/1 |
| 2016/0179437 A1 | 6/2016 | Piduri et al. | |

* cited by examiner

INSTANCE DATA REPLICATION

RELATED CASES

This application claims priority to and benefit of U.S. Provisional Patent Application Ser. No. 62/635,228, filed Feb. 26, 2018, entitled "Instance Data Replication," by Swapnesh Patel, et al., for all applicable purposes, including a right of priority, the contents of which are incorporated by reference herein, in their entirety.

TECHNICAL FIELD

Embodiments described herein generally relate to cloud computing, and more particularly, to sharing data between instances.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

An enterprise utilizing the cloud-based developmental platform to access software services through SaaS or PaaS delivery models may subscribe to one or more cloud-based instances to access these services. For example, multiple different cloud-based instances may be deployed for respective enterprise functions like human resources (HR), information technology (IT), compliance, and the like. Data on each instance of the enterprise may be unique to that instance. However, some of the data (e.g., user data, customer data, product catalog data, and the like) may overlap across multiple instances. It may be desirable to share or replicate this data across multiple instances.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method for replicating instance data includes: detecting, with one or more processors and based on producer replication configuration data of a producer instance, a data modification event associated with a record of a replication target table included in a replication set of the producer instance; generating, with the one or more processors, replication event data of the data modification event when the data modification event is determined to be eligible for replication based on predetermined criteria included in the producer replication configuration data; placing, with the one or more processors, the replication event data on an outbound replication queue to transport the replication event data to a logging infrastructure for replication; reading, with the one or more processors and at a consumer instance subscribing to the replication set of the producer instance, the replication event data from the logging infrastructure based on consumer replication configuration data of the consumer instance; and loading, with the one or more processors, a record onto a replication destination table of the consumer instance based on the read replication event data to replicate the record of the replication target table of the producer instance onto the consumer instance.

In another embodiment, the method may be embodied in computer executable program code and stored in a non-transitory storage device. In yet another embodiment, the method may be implemented on a computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
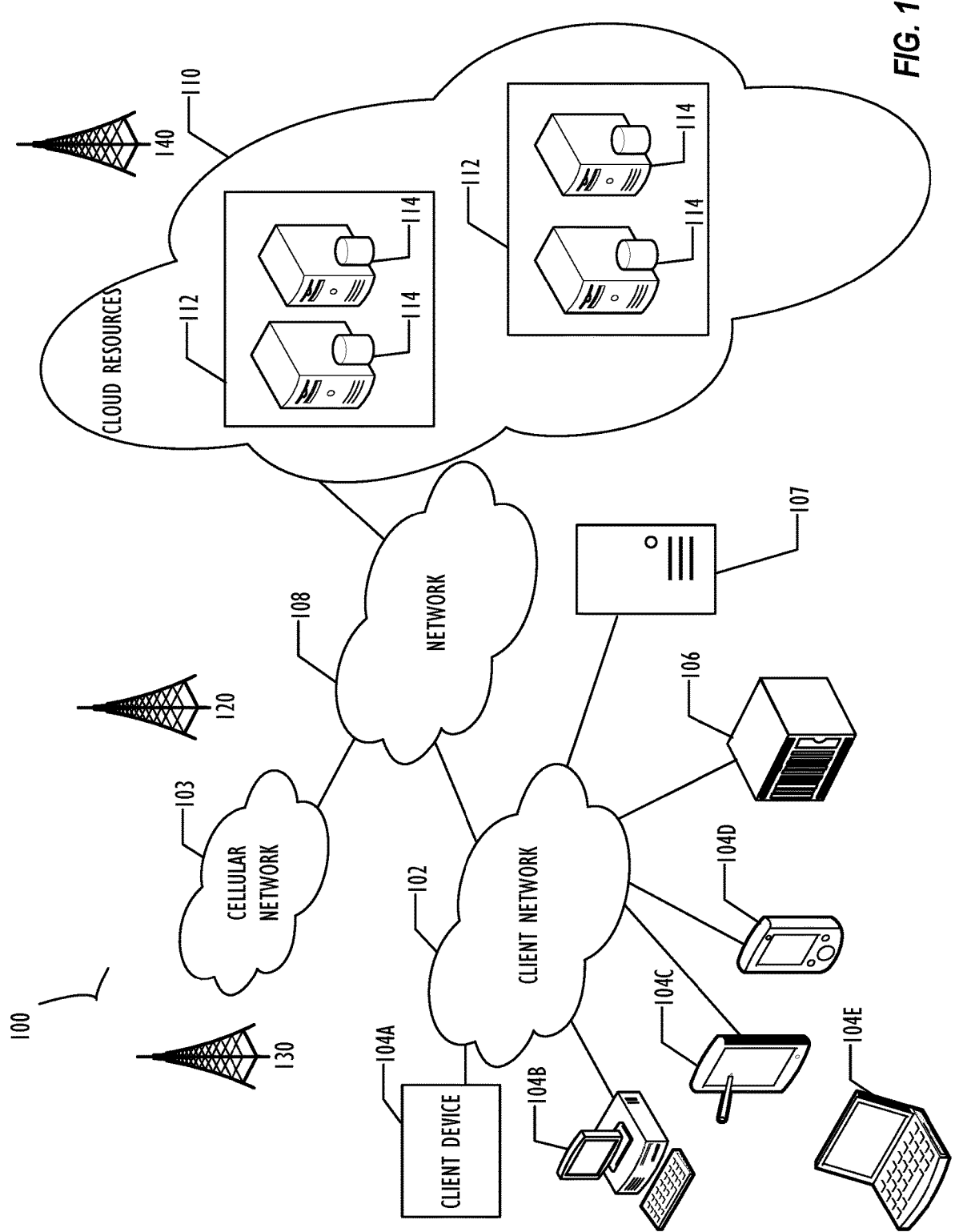
FIG. 1 illustrates a block diagram of cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

The disclosure pertains to replicating or sharing relational datasets between instances by providing capability within a producer instance to configure table-to-table replication (e.g., mirrored schema) and filterable published data set for consumption by one or more consumer instances in a reliable, scalable and secure manner. Techniques disclosed herein look to enable a user (e.g., administrator) of a producer instance to create and activate a replication set that includes one or more tables of the producer instance whose records are to be replicated on one or more consumer instances continuously and in real-time. The user of the producer instance may set one or more filters in the replication set so that record data of a replication target table of the producer instance that meets predetermined criteria is published for consumption by subscriber consumer instances. A user (e.g., administrator) of a consumer instance may subscribe to the replication set of the producer instance to configure a read-only, one-way replication of data included in the replication set of the producer instance to the consumer instance. The user of the consumer instance may subscribe to the replication set using replication setup information and configuration information regarding the replication set (e.g., replication set name, replication set ID, shared key for authentication, producer instance name, producer instance ID, and the like).

Once the subscription is activated, a data modification event (e.g., insert, update or delete event associated with a record of the replication target table of the replication set of the producer instance) at the producer instance is detected and if the data modification event meets predetermined filter criteria set for the replication set by the user of the producer instance, replication event data of the data modification event may be published to a logging infrastructure for consumption by a subscriber instance. The data modification event may be detected by continuously monitoring the replication target table for changes. The filter criteria may include vertical filter criteria specifying which columns (i.e., attributes or fields) of the record of the replication target table are eligible for consumption by the subscriber or horizontal filter criteria specifying the data modification event as eligible for consumption when a predetermined field (column) of the record has a predetermined value. The logging infrastructure may be a publish/subscribe-model messaging platform (e.g., Java Messaging Service®, Rabbit MQ®, Apache® Kafka®, Apache ActiveMQ®) for distributed, reliable, dynamic and scalable transport of a continuous stream of data (i.e., data modification events associated with records of the one or more tables of the replication set) from a producer instance to a consumer instance. Apache, Kafka and ActiveMQ are registered trademarks of the Apache Software Foundation.

The replication event data may be logged in an outbound replication queue at the producer instance prior to publication to the logging infrastructure to provide additional features like cursor tracking, fault tolerance, failover, and resilience during seeding or bootstrapping of data. The subscribing consumer instance may read the replication event data from the logging infrastructure (or from another logging infrastructure where the data is duplicated) and load the data into a replication destination table of the consumer instance to thereby configure instance data replication of the record of the replication target table of the producer instance onto the replication destination table of the consumer instance. The user of the consumer instance may also initially seed (or bootstrap) data of a plurality of records of the replication target table of the producer instance to the replication destination table of the consumer instance when subscribing to the replication. Subsequent publish eligible data modification events associated with records of the replication target table of the producer instance may then be captured continuously and in real-time and transported as a 'delta payload' (i.e., difference between a version of the record prior to the associated data modification event and a version of the record subsequent to the modification) for replication onto the consumer instance.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fix networks, Bluetooth Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102.

FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-based instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, compliance and/or other organization-related functions. These applications may be provided in two or more instances deployed on cloud resources platform/network 110 for users of client devices 104A-E of an enterprise. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL® catalog). MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. Multiple client instances may also be deployed for a single customer to further customize upgrade schedules and provide separation different functions or operational units of the customer. An example of implementing a client instance within a multi-instance cloud architecture will be discussed in more detail below when describing FIG. 2.

Figure 2:
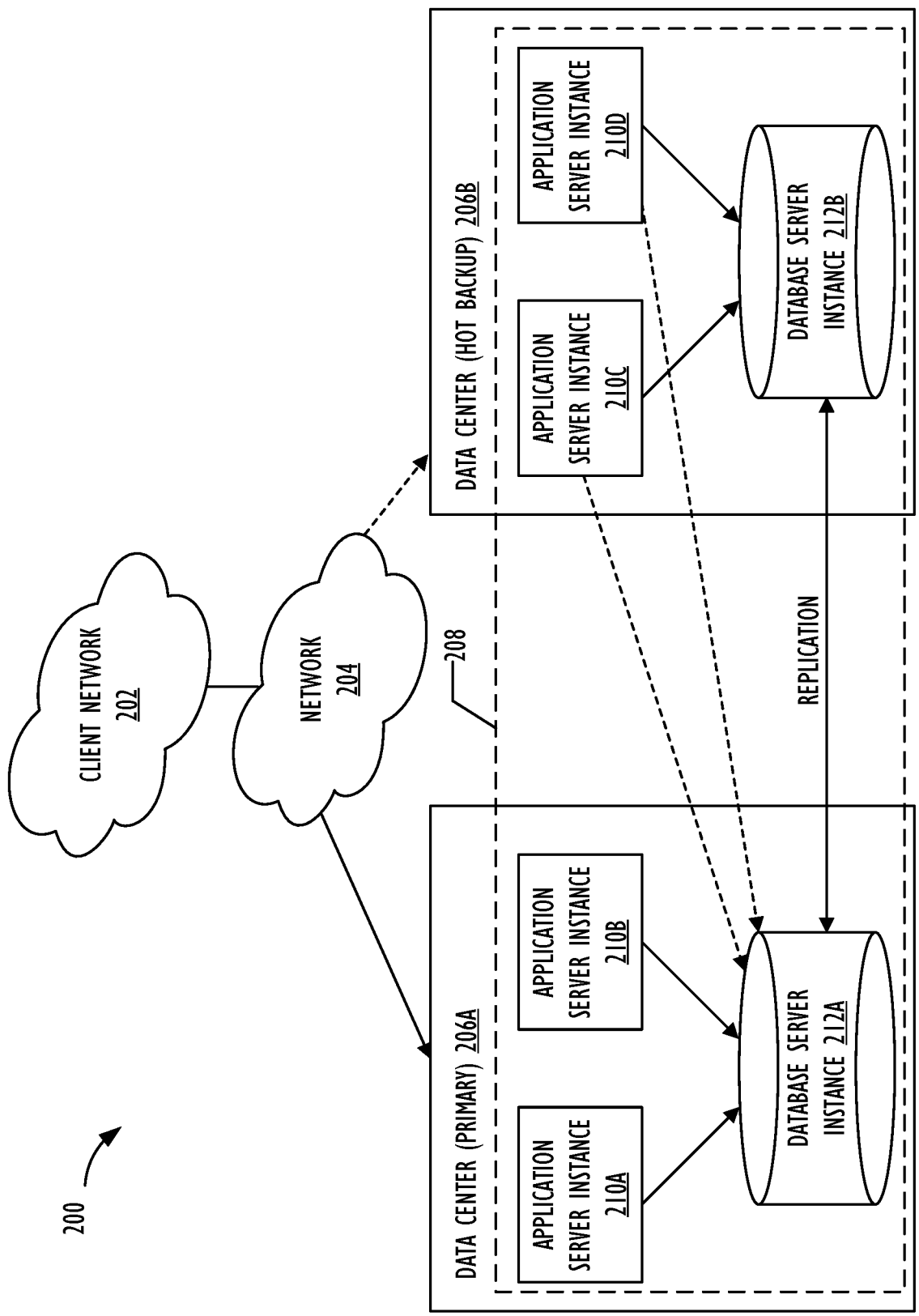
FIG. 2 illustrates a block diagram of multi-instance cloud architecture 200 where one or more embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. respectively. Data centers 206A and 206B can correspond to FIG. 1's data centers 112 located within cloud resources platform/network 110. Using FIG. 2 as an example, a client instance 208 (e.g., a producer instance acting as a source of replication data of an associated replication target table of a replication set, or a consumer instance acting as a consumer of the replicad on data of the producer instance) is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210I and 210S and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing infrastructure 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
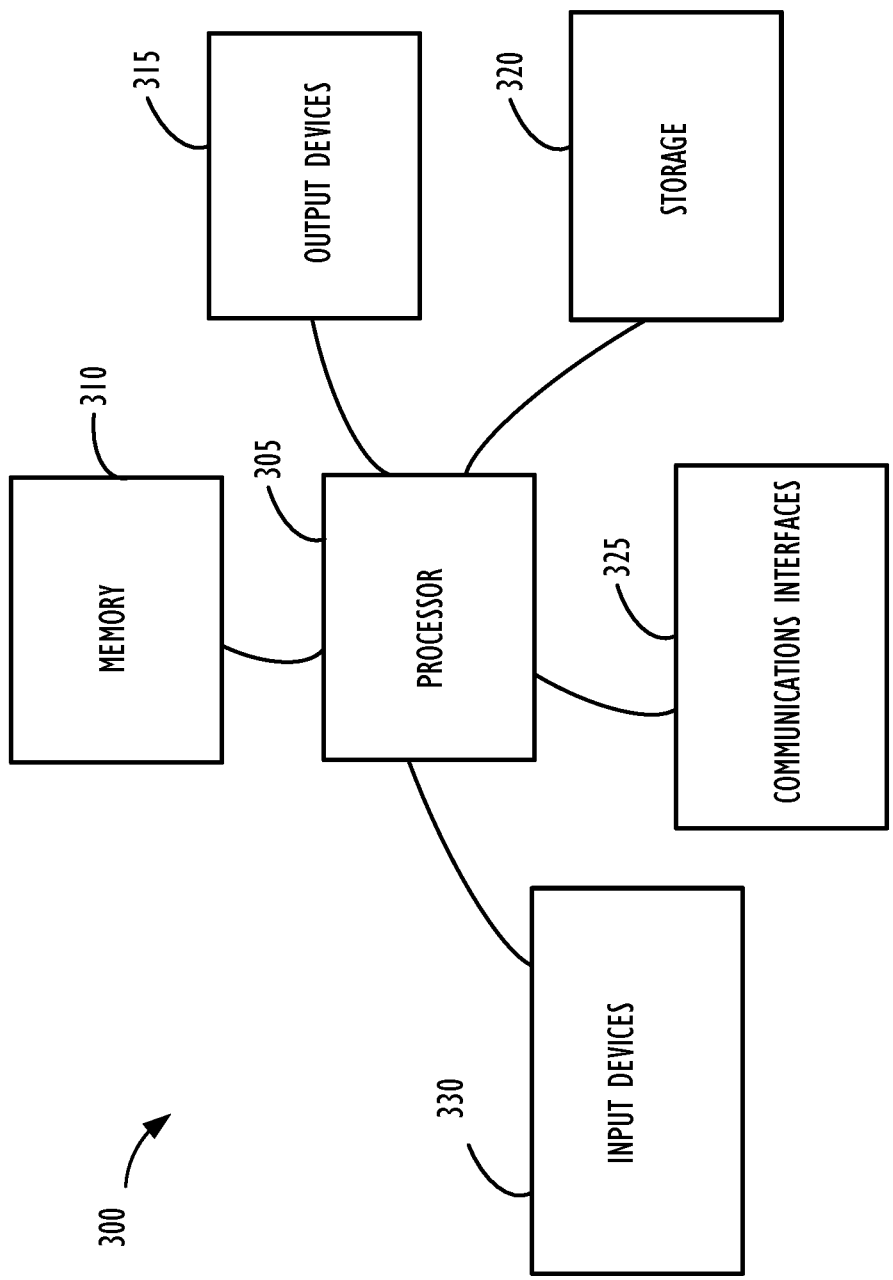
FIG. 3 illustrates high-level block diagram 300 of a processing device (computing system) that may be used to implement one or more disclosed embodiments.

FIG. 3 illustrates a high-level block diagram 300 of a processing device (computing device or system) that may be used to implement one or more disclosed embodiments (e.g., cloud resources platform/network 110, client devices 104A-104E, client instance 208, server instances 114, data centers 206A-206B, producer instance, consumer instance, etc.). For example, computing device 300 illustrated in FIG. 3 could represent a client device or a physical server device and include either hardware or virtual processor(s) depending on the level of abstraction of the computing device. In some instances (without abstraction) computing device 300 and its elements as shown in FIG. 3 each relate to physical hardware and in some instances one, more, or all of the elements could be implemented using emulators or virtual machines as levels of abstraction. In any case, no matter how many levels of abstraction away from the physical hardware, computing device 300 at its lowest level may be implemented on physical hardware. As also shown in FIG. 3, computing device 300 may include one or more input devices 330, such as a keyboard, mouse, touchpad, or sensor readout (e.g., biometric scanner) and one or more output devices 315, such as displays, speakers for audio, or printers. Some devices may be configured as input/output devices also (e.g., a network interface or touchscreen display). Computing device 300 may also include communications interfaces 325, such as a network communication unit that could include a wired communication component and/or a wireless communications component, which may be communicatively coupled to processor 305. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 3, processing device 300 includes a processing element such as processor 305 that contains one or more hardware processors, where each hardware processor may have a single or multiple processor cores. In one embodiment, the processor 305 may include at least one shared cache that stores data (e.g., computing instructions) that are utilized by one or more other components of processor 305. For example, the shared cache may be a locally cached data stored in a memory for faster access by components of the processing elements that make up processor 305. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 3, the processing elements that make up processor 305 may also include one or more other types of hardware processing components, such as graphics processing units (GPUs), application specific integrated circuits (ASICs), field-programmable gate arrays (FPGAs), and/or digital signal processors (DSPs).

FIG. 3 illustrates that memory 310 may be operatively and communicatively coupled to processor 305. Memory 310 may be a non-transitory medium configured to store various types of data. For example, memory 310 may include one or more volatile devices such as random access memory (RAM). Non-volatile storage devices 320 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 320 may be used to store overflow data if allocated RAM is not large enough to hold all working data. The non-volatile storage devices 320 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 305. In one embodiment, the compiling process of the software program may transform program code written in a programming language to another computer language such that the processor 305 is able to execute the programming code. For example, the compiling process of the software program may generate an executable program that provides encoded instructions (e.g., machine code instructions) for processor 305 to accomplish specific, non-generic, particular computing functions.

After the compiling process, the encoded instructions may then be loaded as computer executable instructions or process steps to processor 305 from storage 320, from memory 310, and/or embedded within processor 305 (e.g., via a cache or on-board ROM). Processor 305 may be configured to execute the stored instructions or process steps in order to perform instructions or process steps to transform the computing device into a non-generic, particular, specially programmed machine or apparatus. Stored data, e.g., data stored by a storage device 320, may be accessed by processor 305 during the execution of computer executable instructions or process steps to instruct one or more components within the computing device 300.

A user interface (e.g., output devices 315 and input devices 330) can include a display, positional input device (such as a mouse, touchpad, touchscreen, or the like), keyboard, or other forms of user input and output devices. The user interface components may be communicatively coupled to processor 305. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 300 may comprise other components well known in the art, such as sensors, powers sources, and/or analog-to-digital converters, not explicitly shown in FIG. 3.

Figure 4:
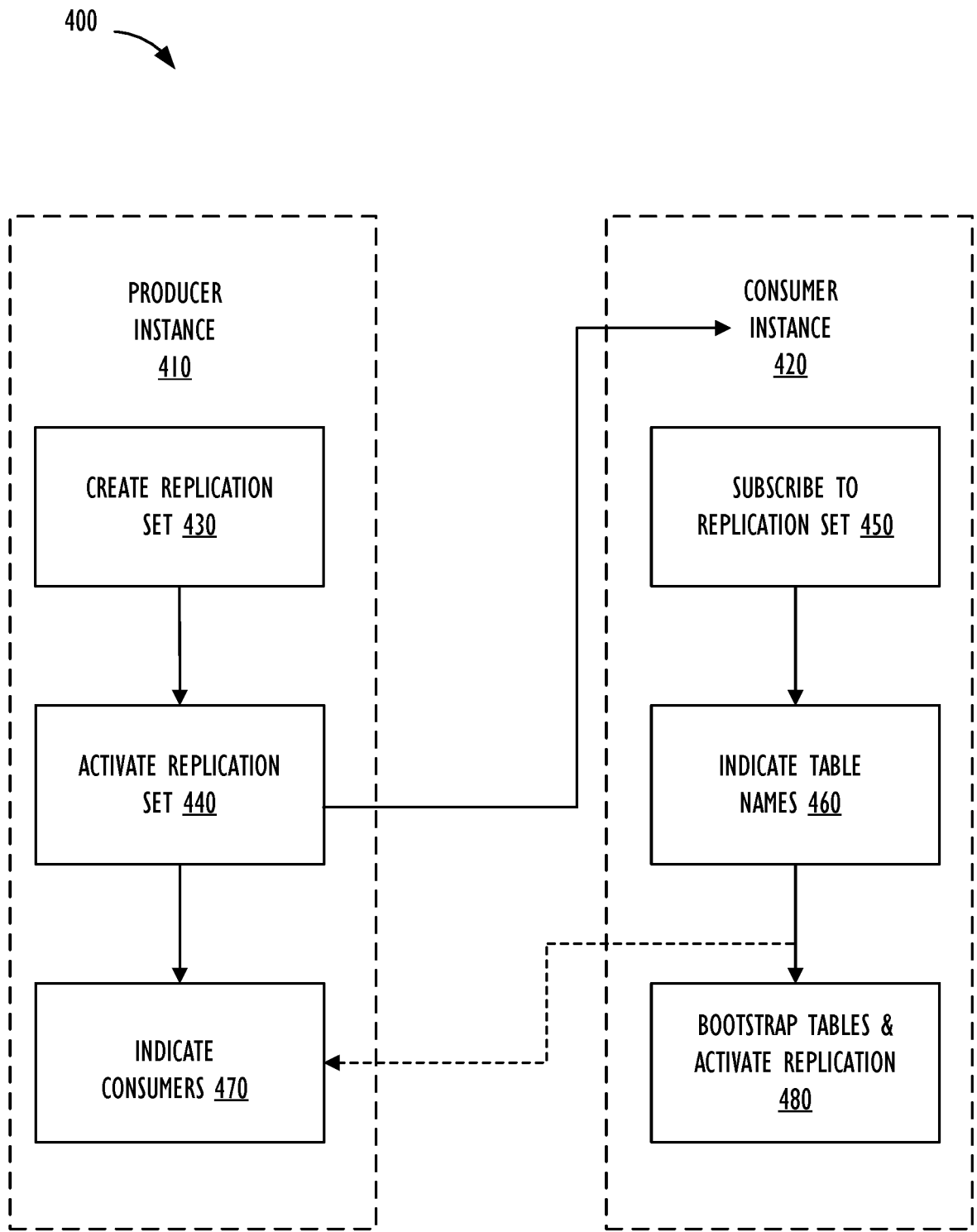
FIG. 4 shows flow chart 400 illustrating a flow for configuration of data replication between instances, in accordance with one or more disclosed embodiments.

FIG. 4 shows flow chart 400 illustrating a flow for initial configuration of data replication between instances, in accordance with one or more disclosed embodiments. Each instance (e.g., producer instance 410, consumer instance 420) may be similar to client instance 208 of FIG. 2 and may belong to the same enterprise customer. For example, a first instance (e.g., producer instance 410) of the enterprise customer may be associated with a core application (e.g., information technology service management (ITSM) application) of the enterprise and a second instance of the enterprise customer may be associated with other applications of the enterprise, such as an HR application, ticket management system, and/or help desk application. The enterprise customer may want to have different applications deployed on different instances to, for example, control frequency of updates made to the different applications without risking introduction of errors instance-wide for core applications and to meet service level agreement requirements. Each instance 410, 420 may include proprietary data of the enterprise that may be stored in, for example, a relational database that organizes data into one or more tables (or relations) of columns and rows, with a unique key identifying each row and primary keys and foreign keys for defining relationships among the tables. For example, a unique primary key may identify each table and, when a new row is written to the table, a new unique value for the primary key may be generated, so that the unique key may uniquely identify a row within a table. Each table may represent one entity type (such as user, customer, company, product, product catalogue, and the like), with each row (or record) of the table representing instances (e.g., user name or user ID, customer name or customer ID) of that type of entity and each column (or attribute) of the table representing values attributed to that instance (e.g., address, department).

There may be use cases that require certain relational tables (e.g., user data tables, customer data tables, product data tables, and the like) of the enterprise to be centrally maintained and managed (e.g., centrally perform insert, update, or delete operations on records of the table) in one instance and replicated to one or more other instances to share the data and make the data available on the other instances. Thus, a particular table(s) (e.g., a replication target table(s)) may be maintained centrally by producer instance 410, and producer instance 410 may be configured for data replication of records of the replication target table to consumer instance 420. The data replication to consumer instance 420 may be a read-only, one-way replication of data of the replication target table of the replication set from producer instance 410 to consumer instance 420. Thus, if the replication event data received at consumer instance 420 is modified, the changes may not be automatically sent back to producer instance 410. On the other hand, if, at producer instance 410, a further change is made to the record associated with the replication event data that was modified at consumer instance 420, when the delta payload associated with the changed record from producer instance 410 is published to consumer instance 420, the changes made to the record at consumer instance 420 may be overwritten with the changes made at producer instance to the same record.

Flow chart 400 begins at block 430 with a processing device (e.g., processing device 300 of FIG. 3) associated with producer instance 410 creating a replication set by setting a name and description of the replication set and adding one or more tables (replication target tables) of producer instance 410 to the replication set as replication data entries responsive to an operation of a user (e.g., administrator). The one or more tables may be tables that include data of producer instance 410 that is eligible for replication to one or more consumer instances 420. Processing device 300 may restrict the user from including in the replication set those tables (e.g., internal tables, configuration tables, script tables, and the like) of producer instance 410 that are not eligible for replication. Further, processing device 300 may set one or more filter criteria associated with the replication target table responsive to operations by the user. The filter criteria may include horizontal filter criteria, vertical filter criteria, attachment filter criteria and the like. Horizontal filter criteria may include filtering based on a predetermined value being attributed to a specific column (or attribute) of a record of the replication target table (e.g., a record associated with a user in the HR department for the department attribute in the user table). Vertical filter criteria may include a filter that specifies which attributes (or columns) of records of the replication target table are to be replicated to consumer instance 420. Attachment filter criteria may specify whether or not an attachment associated with a record of the replication target table is to be replicated to consumer instance 420. At block 430, when creating the replication set responsive to the user operation, processing device 300 may also automatically generate and set a shared encryption key (authentication key; e.g., AES-256 key) and producer instance ID of producer instance 410 in association with the replication set. Alternately, the shared key may be specified by a user operation. The shared key may be used for securely sharing the data of the replication target table between producer instance 410 and consumer instance 420. For example, processing device 300 of producer instance 410 may encrypt data of the replication target table that is transported out for publication to the logging infrastructure. In one embodiment, symmetric key exchange may be implemented to encrypt data of the replication target table.

At block 440, processing device 300 may activate the replication set by setting replication configuration data responsive to an operation by the user. Once the replication set is activated, processing device 300 may indicate the replication configuration data including replication setup information of producer instance 410. For example, processing device 300 may display the replication setup information of producer instance 410 on a display. The producer replication configuration data may include information regarding replication target tables of the replication set, replication set name, replication set ID, description, shared encryption/decryption key, producer instance ID, metadata, information regarding one or more subscribing consumer instances that are authorized to receive the data from the replication set, one or more filter criteria (e.g., horizontal, vertical, or attachment filter criteria). Further, at block 440, processing device 300 begins monitoring the replication target table(s) included in the activated replication set for detecting data modification events associated with records of the replication target table and for transporting out replication event data based on the replication configuration data of producer instance 410 to the logging infrastructure for consumption by subscribing instances.

After the replication set is activated, one or more consumer instances 420 may subscribe to the replication set using the corresponding replication setup information by setting consumer replication configuration data. For example, at block 450, a processing device (e.g., processing device 300) associated with consumer instance 420 may subscribe to the replication set responsive to an operation of a user (e.g., administrator) of consumer instance 420. Processing device 300 may set the replication setup information (e.g., replication set name, replication set ID, shared encryption key, producer instance ID) based on user input and verify the information with producer instance 410 to securely subscribe to the replication set. At block 450, processing device 300 may also store the replication setup information as replication configuration data of consumer instance 420. Replication configuration data of consumer instance 420 may include information regarding one or more corresponding replication target tables, information regarding one or more corresponding replication destination tables, replication set name, replication set ID, replication set description, shared encryption/decryption key, producer instance 410 ID, metadata, one or more filter criteria (e.g., horizontal, vertical, or attachment filter criteria), cursor data indicating topic address in logging infrastructure from where consumer instance 420 may resume reading, and the like. Additional consumer instances (not shown) may also subscribe to the same replication set of producer instance 410 using the same replication setup information.

At block 460, responsive to a user operation, processing device 300 may indicate one or more table names of the replication target table(s) of the replication set whose record data is to be replicated onto a replication destination table on consumer instance 420. At block 460, processing device 300 may synchronize replication configuration with the replication set at producer instance 410 and store the configuration as replication configuration data of consumer instance 420. Processing device 300 of consumer instance 420 may also indicate the one or more filter criteria associated with the replication target table and additional metadata associated with the replication set and the tables included in the replication set.

At block 470, after consumer instance 420 has successfully joined the replication set by subscribing to the replication set, processing device 300 associated with producer instance 410 may, responsive to a user operation, indicate information (e.g., consumer instance 420 name, consumer instance 420 ID) associated with one or more consumer instances 420 that have subscribed to the replication set. Thus, a user of producer instance 410 may have visibility into who is consuming the replication set activated by producer instance 410.

At block 480, responsive to a user operation, processing device 300 associated with consumer instance 420 may activate data replication for the subscribed replication set at block 450. In addition, at block 480, responsive to a user operation, processing device 300 may seed or bootstrap the replication destination table of consumer instance 420 by performing a batch download operation of all eligible data of the replication target table. To bootstrap the replication destination table, processing device 300 associated with producer instance 410 may transport out to the logging infrastructure, record data of all records of the replication target table that is eligible for replication based on the one or more filter criteria of the table. Users of both producer and consumer instances 410 and 420 may have visibility into progress of the seeding, and once seeding is complete, the users may also have visibility into health of the replication, replication setup information, and the like. Processing device 300 may further encrypt the data that is to be transported out using the shared key of the replication set. Processing device 300 associated with consumer instance 420 may then transport in and decrypt the bootstrap data from the logging infrastructure. Modifications (e.g., insert, update or delete events) made to records of the replication target table at producer instance 410 subsequent to activation of the replication at consumer instance at block 480 may continuously and automatically be replicated in real-time to the replication destination table at consumer instance 420. Thus, an encrypted delta payload generated and transported out to the logging infrastructure by producer instance 410 will be transported in and decrypted by processing device 300 associated with consumer instance 420 using replication configuration information of consumer instance 420 to thereby securely share replication data as read-only, one-way replication of data included in the replication set from producer instance 410 to the consumer instance 420.

Figure 5:
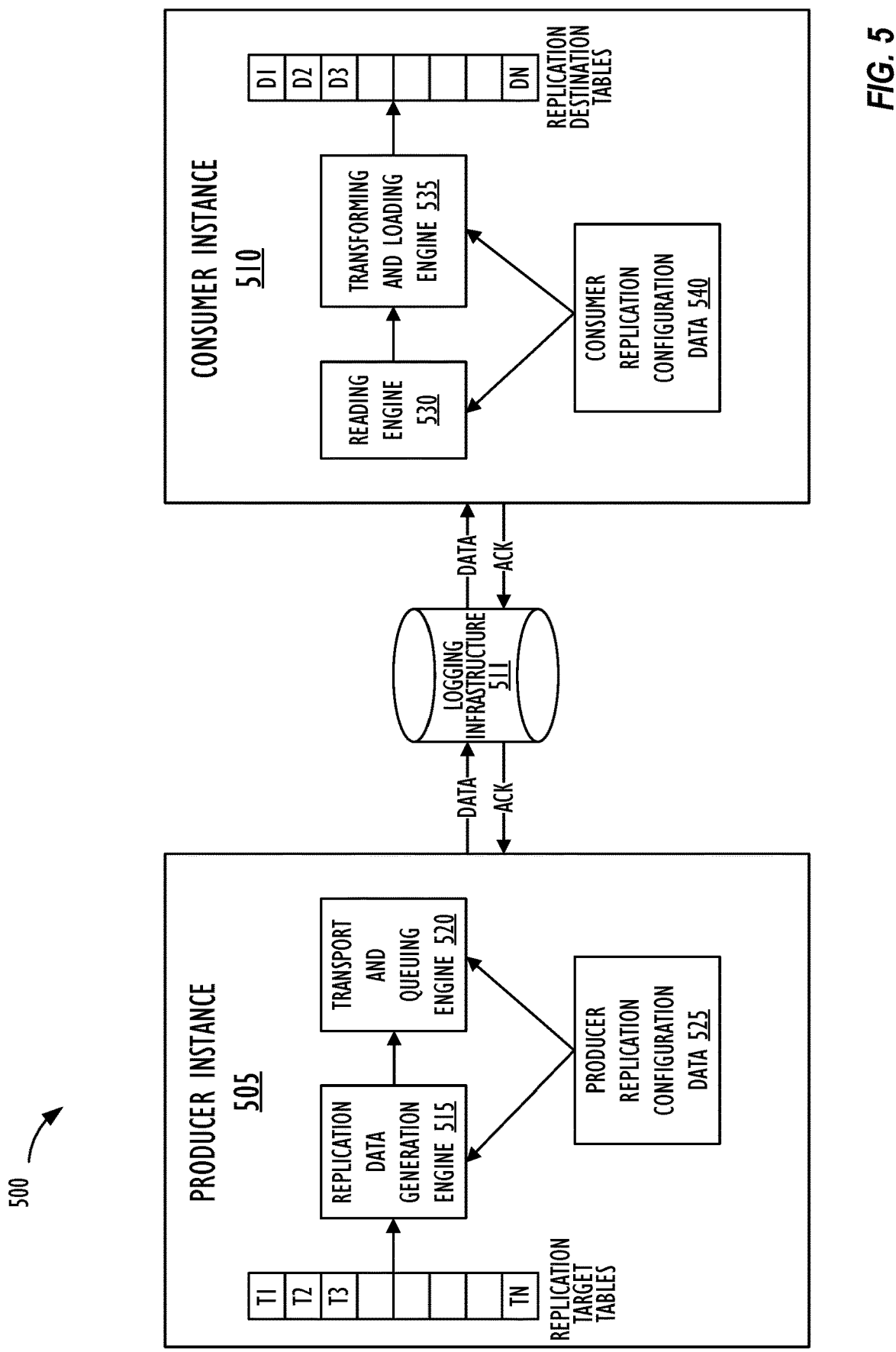
FIG. 5 illustrates a block diagram of a system 500 where one or more embodiments of the present disclosure may operate.

FIG. 5 illustrates a block diagram of a system 500 where one or more embodiments of the present disclosure may operate. As shown in FIG. 5, system 500 includes producer instance 505 and consumer instance 510 that are configured for instance data replication (or sharing) via logging infrastructure 511. Producer instance 505 and consumer instance 510 may be similar to producer instance 410 and consumer instance 420 of FIG. 4, respectively. Further, each of producer instance 505 and consumer instance 510 may be configured as client instance 208 of FIG. 2. Producer instance 505 may include replication target tables T1-TN, replication data generation engine 515, transport and queuing engine 520 and producer replication configuration data 525. Producer replication configuration data 525 may include one or more tables that store information regarding one or more replication sets that include one or more replication target tables T1-TN, whose data is actively being published by producer instance 505 for consumption by one or more consumer instances 510. For each replication set, producer replication configuration data 525 may include information regarding one or more corresponding replication target tables T1-TN, replication set name, replication set ID, description, shared encryption/decryption key, producer instance 505 ID, metadata, information regarding one or more subscribing consumer instances 510 that are authorized to receive the data from the replication set, one or more filter criteria (e.g., horizontal, vertical, or attachment filter criteria).

Replication data generation engine 515 may be an object or programming language class (e.g., Java application programming interface (API)) that is used for performing operations on the relational database of producer instance 505. As soon as the replication set is activated at producer instance 505, replication data generation engine 515 may start listening to the data modification events happening at the replication target table(s) and continuously monitor the replication target table(s) so that when a record on the replication target table is modified (e.g., insert, update or delete record on the table), replication data generation engine 515 may detect the modification and return zero or more records that have been modified from the table as an ordered list. Replication data generation engine 515 may return both records (e.g., rows) and fields (e.g., columns) based on the detection of the data modification event. In one embodiment, replication data generation engine 515 may generate a delta payload corresponding to the record that is modified so that only a modified portion (e.g., a column) of the record is queued for transport to consumer instance 510. Replication data generation engine 515 may further determine based on producer replication configuration data 525 whether the data modification event warrants generation of replication event data for publication based on whether the data modification event meets one or more filter criteria associated with the replication target table of the replication set. Thus, only data that is eligible for replication may be transported from producer instance 505 for consumption.

Transport and queuing engine 520 may receive the replication event data, that is associated with the data modification events and that is eligible for publication, in the form of messages from replication data generation engine 515 and temporarily and sequentially store these messages into an outbound replication queue. Transport and queuing engine 520 may keep track of a cursor for determining which message is to be transported out next from the outbound replication queue so that even in the event of a network connection or server failure, message duplication or message skipping is avoided and the sequential order of message transport from the outbound replication queue is maintained. Thus, transport and queuing engine 520 may offer fault-tolerance and resilience features when transporting out delta payload associated with the replication set or when performing the initial batch transport process of bootstrapping (or seeding) the replication destination table of consumer instance 510, and resuming automatically after a failure without breaking the sequential order of message transport. Transport and queuing engine 520 may then sequentially read the messages stored in the outbound replication queue and transport the messages out to logging infrastructure 511 for publication. In one embodiment, transport and queuing engine 520 may 'stitch' the outgoing messages by generating a linked list of the messages to ensure that none of the messages will be lost in transition between producer and consumer instances 505 and 510. Thus, transport and queuing engine 520 may act as a producer object that reads an outgoing message from the queue, stitch the message, transport the message to logging infrastructure 511, receive a confirmation from logging infrastructure 511 that the transported message was received successfully and persisted in the local base, read and stitch the next message in sequential order, and so on. Transport and queuing engine 520 may use hypertext transfer protocol (HTTP) or similar protocol to transmit the replication event data to logging infrastructure 511.

Logging infrastructure 511 is a publish/subscribe-model messaging platform. Logging infrastructure 511 may be a message bus that is implemented using one or more message transport platforms like Java Messaging Service®, Rabbit MQ®, Apache® Kafka®, or Apache ActiveMQ®. (Apache, Kafka and ActiveMQ are registered trademarks of the Apache Software Foundation.) Alternately, logging infrastructure 511 may be implemented using any message-oriented middleware (MOM) that implements advanced message queuing protocol (AMQP) and includes hardware and/or software infrastructure that supports sending and receiving messages between distributed systems. Logging infrastructure 511 may be a streaming platform designed for a distributed architecture that provides a fast and scalable distributed messaging platform, capable of not just publish-and-subscribe, but also storage and processing of data within the stream. Proprietary platforms, such as the Confluent Platform, which improves Apache Kafka, may be utilized to implement logging infrastructure 511 by expanding integration capabilities, adding tools to optimize and manage Kafka clusters, and methods to ensure the streams are secure, thereby making it easier to build and operate logging infrastructure 511. Messages sequentially transported out of producer instance 505 by transport and queuing engine 520 may be received by logging infrastructure 511 and stored at a particular address for consumption by consumer instance 510 for a predetermined period of time (e.g., seven days). Logging infrastructure 511 may include a cluster of processing devices (e.g., processing device 300) and may be deployed on one or more data centers 112 and one or more server instances 114 of cloud resources platform/network 110 as a shared service to enable multiple client instances 208 (e.g., multiple producer instances 505 and multiple consumer instances 510) to share data between each other. Since logging infrastructure 511 may be a shared service, message stored in logging infrastructure 511 may be encrypted using the shared keys of corresponding replication sets in order to ensure data security. For each subscribed replication set of consumer instance 510, logging infrastructure 511 may remember the last read offset based on consumer instance 510 ID in order to transmit messages (replication event data) to consumer instance 510 in sequential order. In one embodiment, logging infrastructure 511 may include multiple logging infrastructures (See FIGS. 6 and 7) hosted on multiple data centers hosting multiple producer and consumer instances, and messages between the multiple logging infrastructures may be replicated.

Consumer instance 510 may include reading engine 530, transforming and loading engine 535, consumer replication configuration data 540, and one or more replication destination table(s) D1-DN respectively corresponding to the one or more replication target tables T1-TN of producer instance 505. Consumer replication configuration data 540 may include one or more tables that store information regarding one of more replication sets that include one or more replication target tables T1-TN whose data is actively being consumed by consumer instance 510 as read-only, one-way replication data. That is, consumer replication configuration data 540 may store data generated (or entered by user) when consumer instance 510 subscribes to a replication set of producer instance 505. For each replication set, consumer replication configuration data 540 may include information regarding one or more corresponding replication target tables T1-TN, information regarding one or more corresponding replication destination tables D1-DN, replication set name, replication set ID, replication set description, shared encryption/decryption key, producer instance 505 ID, metadata, one or more filter criteria (e.g., horizontal, vertical, or attachment filter criteria), cursor data indicating topic address in logging infrastructure 511 from where consumer instance 510 may resume reading, and the like.

Reading engine 530 may use consumer replication configuration data 540 to read messages from particular topics on logging infrastructure 511 that are published by a particular producer instance 505 whose replication set has been subscribed to by consumer instance 510. For example, reading engine 530 may use consumer replication configuration data 540 like producer instance 505 ID, shared key, replication set name or ID, and the like to determine a topic address of an application set associated with consumer instance 510 on logging infrastructure 511 from where reading engine 530 may read messages in sequential order for the subscribed replication set, and decrypt the read messages using the shared key to obtain replication event data associated with a data modification event on the replication target table T1-TN of the replication set of producer instance 505. Thus, using consumer replication configuration data 540, reading engine 530 may determine the name and address of the topic on logging infrastructure 511 from where reading engine 530 is to start reading the messages in sequential order. Reading engine 530 may further include logic to provide failover resilience features so that in the event of consumer instance 510 failover, reading engine 530 may keep track of the address from where reading engine 530 may resume reading from logging infrastructure 511 even when reading from a different instance of logging infrastructure 511 belonging to a different data center where consumer instance 510 is deployed after failover to consume from (or produce to) a local logging infrastructure 511.

Transforming and loading engine 535 may then perform data transformations on the read and decrypted replication event data and load the data of the record onto replication destination table D1-DN associated with the replication target table T1-TN to apply the data modification event associated with the record of replication target table T1-TN onto the corresponding record of replication destination table D1-DN of consumer instance 510. In one embodiment, transforming and loading engine 535 may include logic to handle uncommitted replication data responsive to occurrence of an exception. For example, when loading replication event data onto replication destination table D1-DN fails due to a primary key violation or unique key violation, loss of network connection, or instance failure, transforming and loading engine 535 may indicate to a user (e.g., administrator) of consumer instance 510 that load of a particular record has failed. Transforming and loading engine 535 may further include logic to perform a 'lazy seed' of the failed record responsive to an operation of the user or automatically based on predetermined settings indicating a preference of the user. Transforming and loading engine 535 may also be configured to load configuration tables (e.g., scripts, workflows) associated with replication event data loaded onto replication destination tables D1-DN so that existing scripting logic (e.g., form auto fill, specific scripts or workflows invoked on insert, update or delete on table) of replication target table T1-TN of producer instance 505 is maintained at consumer instance 510.

Figure 6:
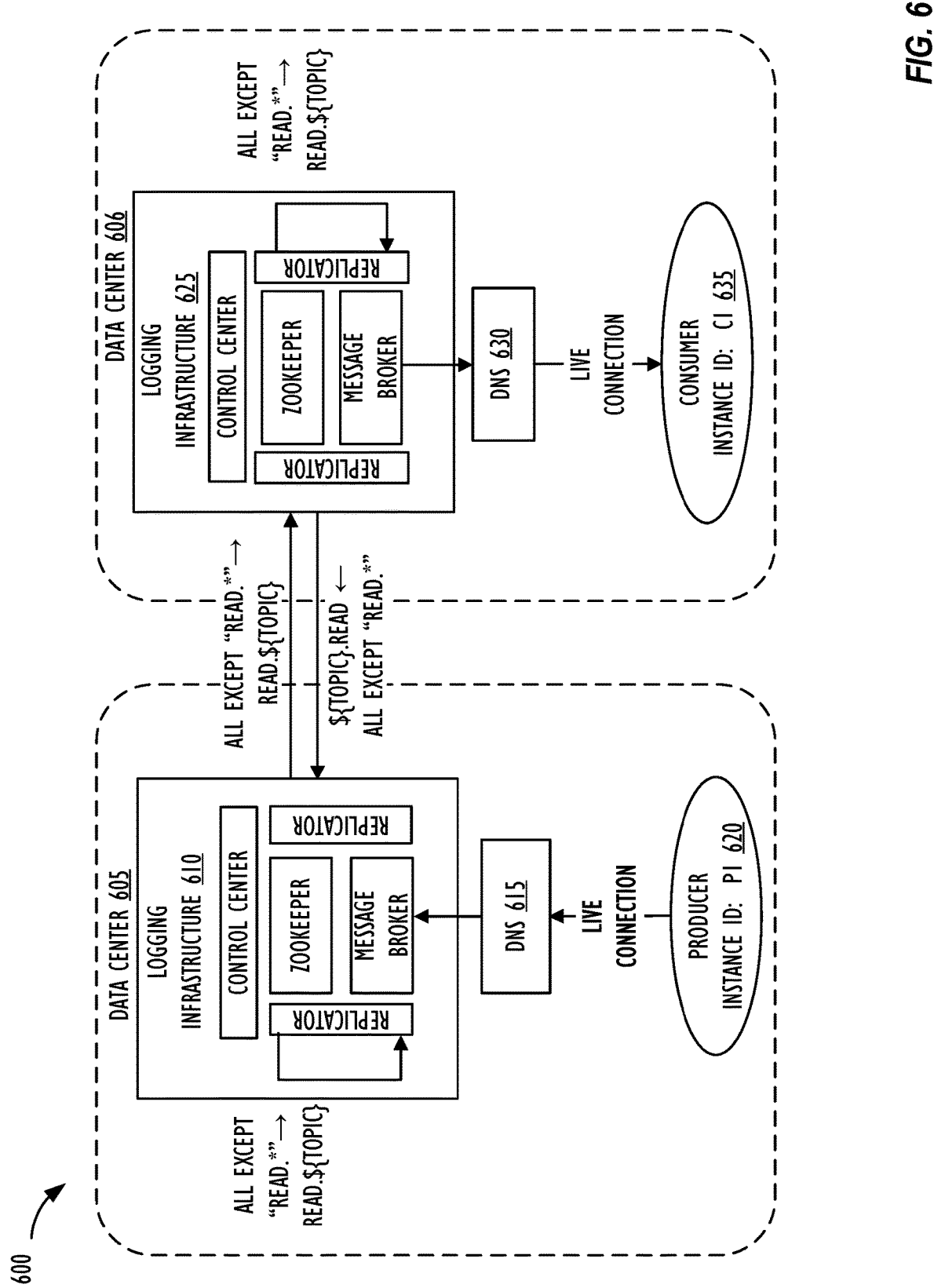
FIG. 6 illustrates active-active message replication 600, in accordance with one or more disclosed embodiments.

FIG. 6 illustrates active-active message replication 600, in accordance with one or more disclosed embodiments. Each of data centers 605 and 606 may be similar to data centers 112 of FIG. 1 or data centers 206A and 206B of FIG. 2. Further, each of producer instance 620 and consumer instance 635 may be configured as client instance 208 of FIG. 2, or as producer instance 410 and consumer instance 420 of FIG. 4, or as producer instance 505 and consumer instance 510 of FIG. 5. As shown in FIG. 6, producer instance 620 having instance ID P1 may be deployed on data center 605 while consumer instance 635 having instance ID C1 may be deployed on data center 606. Data centers 605 and 606 may be distributed geographically and may provide cloud-computing services by hosting multiple producer and consumer instances 620 and 635 with high latency and throughput, and with resilience to failover of either producer instance 620 or consumer instance 635. In one embodiment, active-active message replication 600 may be implemented so that producer instance 620 may produce (publish) data (replication event data of replication set) to logging infrastructure 610 that is local to data center 605 and consumer instance 635 may consume data from logging infrastructure 625 that is local to data center 606, thereby improving latency and throughput by producing or consuming data locally. Each of logging infrastructure 610 and logging infrastructure 625 may be similar to logging infrastructure 511 shown in FIG. 5. Logging infrastructure 610 may include control center, zookeeper, message broker (e.g., Kafka broker) and one or more replicators. Zookeeper and message broker may be implemented using one or more open source distributed streaming technologies that are well-known in the art and detailed description thereof is omitted here. Control center may provide features to administrators to monitor health of logging infrastructure 610. For example, control center may provide a web based user interface where an administrative user may navigate to monitor health of logging infrastructure 610 by drilling down to a particular topic and performing predetermined operations. In one embodiment, control center may be implemented using Confluent platform for Apache Kafka®. Logging infrastructure 610 may further include one or more replicators which may be applications (i.e., replicator processes) for replicating messages between and within logging infrastructures 610 and 625. Thus, when producer instance 620 connects to logging infrastructure 610 via domain name system (DNS) 615 to publish replication event data associated with a record of replication target table of producer instance 620, the replicator of logging infrastructure 610 replicates the published replication event data onto logging infrastructure 625 of data center 606 when consumer instance 635 is deployed by creating a duplicate copy of the message on logging infrastructure 625 for consumption by consumer instance 635. Thus a copy of the same message may be maintained on both logging infrastructures 610 and 625 so that even if the case of consumer instance 635 failover, consumer instance 635 can start consuming from either logging infrastructure 610 or 625 where consumer instance 635 is hosted after failover. Further, the one or more replicators of logging infrastructure 610 may also include applications (i.e., replicator processes) for replicating messages within the same logging infrastructure 610 for local consumption.

Logging infrastructure 625 is implemented in a manner similar to logging infrastructure 610 and detailed description thereof is omitted here. Consumer instance 635 may connect to logging infrastructure 625 via DNS 630, and when consumer instance 635 consumes data from a topic on logging infrastructure 625 that consumer instance 635 is subscribed to, consumer instance 635 will read the data using the topic address obtained based on replication configuration data of consumer instance 635 to read the replication event data that has been replicated to logging infrastructure 625 from logging infrastructure 610. Thus, by implementing active-active message replication 600, replication data can be produced and consumed from local logging infrastructure local to the data center even when producer and consumer instances are deployed on different data centers.

Figure 7:
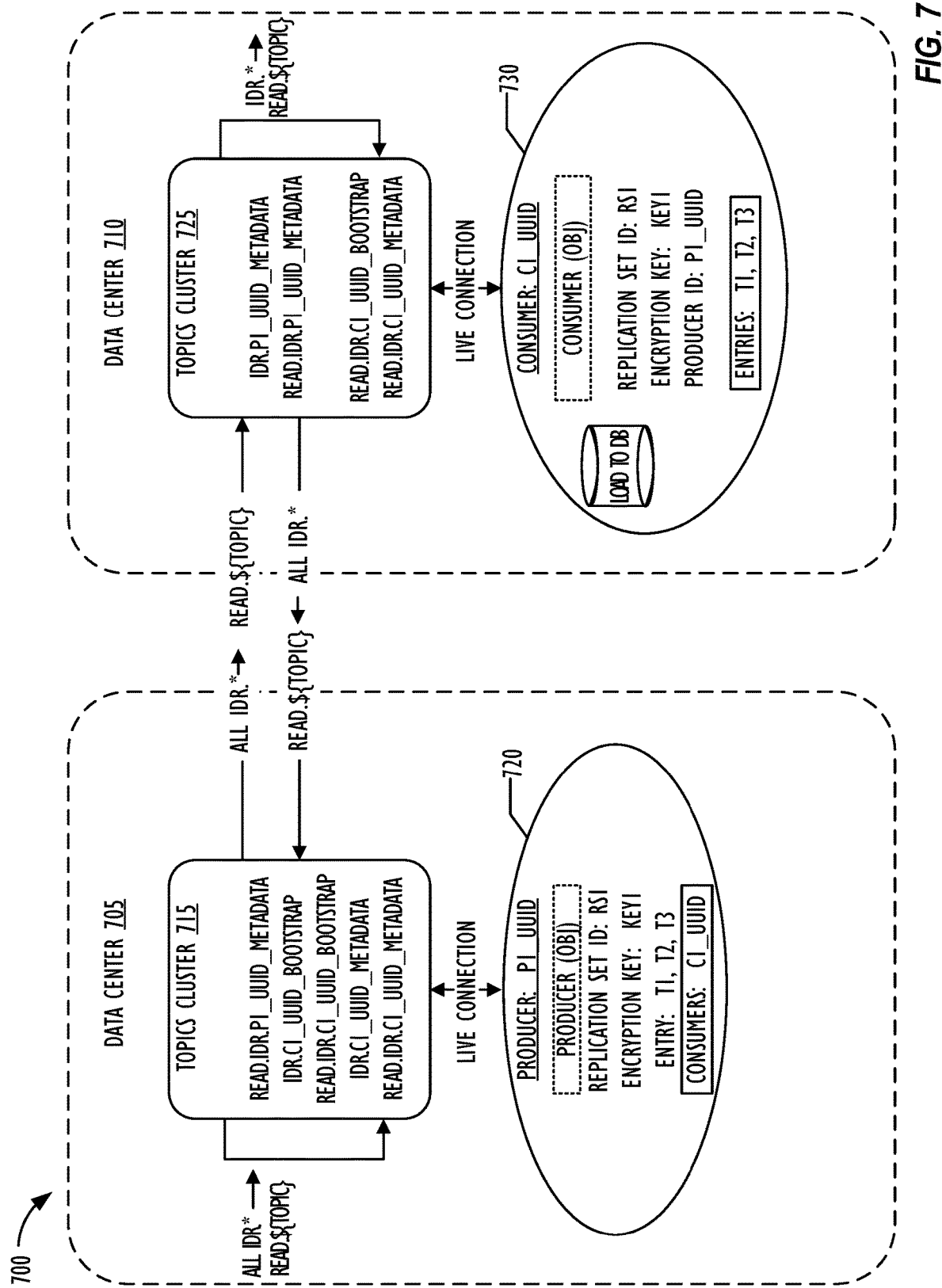
FIG. 7 illustrates replication data flow 700 between instances, in accordance with one or more disclosed embodiments.

FIG. 7 illustrates replication data flow 700 between instances, in accordance with one or more disclosed embodiments. Each of data centers 705 and 710 may be similar to data centers 112 of FIG. 1 or data centers 206A and 206B of FIG. 2, or data centers 605 and 606 of FIG. 6. Further, each of producer instance 720 and consumer instance 730 may be configured as client instance 208 of FIG. 2, or as producer instance 410 and consumer instance 420 of FIG. 4, or as producer instance 505 and consumer instance 510 of FIG. 5, or as producer instance 620 and consumer instance 635 of FIG. 6. After deployment on data canter 705, producer instance 720 may be authenticated to topics cluster 715 to create a connection with topics cluster 715 and authentication credentials of topics cluster 715 may be stored on a properties table on producer instance 720. Further, as explained above with reference to active-active message replication 600 of FIG. 6, replicator processes may be performed to replicate messages (i.e., stream of replication event data from producer to consumer) between topics cluster 715 and 725 so that a duplicate copy of a message published by a producer instance to a topic on topics cluster 715 is saved to a corresponding topic on topics cluster 725, and a duplicate copy of every message published by a producer instance to a topic on topics cluster 725 is saved to a corresponding topic on topics cluster 715, so that every producer and consumer instance on data centers 705 and 710 may produce and consume data locally to local topics cluster 715 and 725. In one embodiment, if the corresponding topic on topics cluster 725 is not present when the duplicate copy of the message published by the producer instance to the topic on topics cluster 715 is to be saved to the corresponding topic on topics cluster 725, the replicator process may auto-create the corresponding topic, and vice-versa. Further, the replicator process may also replicate messages within the same topics cluster 715 for local consumption.

An initial publish-subscribe handshake to setup replication between producer instance 720 on data center 705 and consumer instance 730 on data center 710 may include producer instance 720 having instance ID "P1_UUID" activating a replication set having replication set ID "RS1"; shared encryption/decryption key "KEY1"; and replication target table entries "T1, T2, T3". After activating the replication set, a producer object on producer instance 720 may establish a live connection with local topics cluster 715 (i.e., logging infrastructure) to listen for incoming requests from topics cluster 715. Consumer instance 730 having instance ID "C1_UUID" on data center 710 may subscribe to the replication set by providing replication setup information including producer instance ID "P1_UUID"; replication set ID "RS1"; and shared encryption/decryption key "KEY1". After the subscription, a consumer object of consumer instance 730 may establish a live connection with local topics cluster 725 to listen to incoming requests from topics cluster 725. After subscription, consumer instance 730 may send message to producer instance 720 via topics clusters 725 and 715 to share list of replication target table entries of the subscribed replication set. Responsive to the request, producer instance 720 may store instance ID "C1_UUID" of consumer instance 730 as replication configuration data on producer instance 720 showing that consumer instance 730 having instance ID "C1_UUID" is subscribed to the replication set of producer instance 720. Producer instance 720 may further transmit a response to consumer instance 730 including replication target table entries "T1, T2, T3" based on the replication configuration data on producer instance 720. Consumer instance 730 may then receive and store as replication configuration information on consumer instance 730, replication target table entries "T1, T2, T3" associated with the replication set, thereby completing initial instance data replication setup between producer and consumer instances 720 and 730.

Bootstrapping replication destination tables on consumer instance 730 with seed data may include consumer instance 730 sending message to producer instance 720 via topics clusters 715 and 725 to start bootstrap for selected tables out of replication target table entries "T1, T2, T3" associated with the replication set. Responsive to the received request, producer instance 720 may start sending bootstrap or seed data of the requested tables from the replication set to consumer instance 730. Consumer instance 730 may then load the received bootstrap data onto corresponding replication destination tables of the replication set to complete bootstrapping the tables.

After the replication has been activated and subscribed, and following bootstrapping, producer instance 720 may continuously monitor replication target table entries "T1, T2, T3" for data modification events and detect those data modification events that are eligible for replication based on the replication configuration data including associated filter criteria. Consumer instance 730 may switch to listen to replication update messages from local topics cluster 725 including replication event data of the replication set from producer instance 720, and producer instance 720 may send replication updates including replication event data eligible for replication to local topics cluster 715. Messages posted to topics on topics cluster 715 may be duplicated onto corresponding topics on topics cluster 725 and loaded onto corresponding records on corresponding replication destination tables of the replication set on consumer instance 730. Producer instance 720 may also include logic to periodically memorize a last sent message ID (i.e., cursor) for the replication set to provide failover support.

Producer instance 720 may include logic for failover support for producer instance 720 failover. In case producer instance 720 deployed on data center 705 fails over, producer instance 720 may be redeployed on data center 710. The producer object of producer instance 720 redeployed on data center 710 may establish live connection with topics cluster 725 of data center 710 to listen to incoming metadata requests from topics cluster 725. Producer instance 720 may utilize the periodically memorized last sent message ID (i.e., cursor) for the replication set to wait for active-active replication of messages between topics clusters 715 and 725 to catchup to the last sent message ID by polling topics cluster 725 until the message corresponding to the last sent message ID memorized by producer instance is duplicated onto topics cluster 725 from topics cluster 715. Once producer instance 720 confirms that the message having the last sent message ID has been duplicated to topics cluster 725, producer instance 720 may resume publishing messages corresponding to the replication event data onto topics cluster 725 of data center 710, thereby ensuring that message duplication or message skipping is avoided and the sequential order of message transport from the outbound replication queue is maintained even in the event of producer failover.

Consumer instance 730 may also include logic for failover support for consumer instance 730 failover. In case consumer instance 730 deployed on data center 710 fails over, consumer instance 730 may be redeployed on data center 705. The consumer object of consumer instance 730 redeployed on data center 705 may establish live connection with topics cluster 715 of data center 705 to listen to incoming metadata requests from topics cluster 715. Consumer instance 730 may memorize a last read message timestamp $T_n$ of a last message read by consumer instance 730 from topics cluster 725 of data center 710 pre-failover. Post-failover and redeployment of consumer instance 730 on data center 705, consumer instance 730 may utilize the memorized last read message timestamp $T_n$ and start reading messages the corresponding topic address of topics cluster 715 from a time that is a predetermined time earlier (e.g., $T_n$–10 minutes) than the last read message timestamp $T_n$. Thus, a reading engine (e.g., reading engine 530 of consumer instance 510 of FIG. 5) of consumer instance 730 may support failover by continuing to read from local topics cluster 715 on which a duplicate copy of the replication event data message from producer instance 720 resides. The reading engine of consumer instance 730 may continue reading without losing any messages in the sequential linked list of messages from producer instance 720 or without duplicating any messages by keeping track of the last read message timestamp $T_n$ pre-failover and then continuing reading from the tracked last message post-failover.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A computer system configured to replicate instance data, comprising:
   memory;
   one or more processing units; and
   a network interface communicatively coupled to the one or more processing units and the memory, wherein the memory comprises computer instructions that, when executed by the one or more processing units, cause the computer system to:
      activate a replication set at a producer instance by setting producer replication configuration data, wherein the replication set includes a replication target table, and wherein the producer replication configuration data comprises a producer instance ID, a replication set ID, a shared key for encrypting/decrypting the data of the replication target table, horizontal filter criteria for replicating data of the replication target table, and vertical filter criteria for replicating data of the replication target table;
      receive, from a consumer instance, a subscription request to subscribe to the replication set of the producer instance;
      detect, based on the producer replication configuration data of the producer instance, a data modification event associated with a record of the replication target table included in the replication set of the producer instance;
      generate replication event data of the data modification event when the data modification event is determined to be eligible for replication based on predetermined criteria included in the producer replication configuration data;
      place the replication event data in an outbound replication queue to transport the replication event data to a logging infrastructure for replication; and
      transmit, to the consumer instance subscribing to the replication set of the producer instance, the replication event data from the logging infrastructure based on consumer replication configuration data of the consumer instance, wherein the consumer instance is configured to load a record onto a replication destination table of the consumer instance based on the replication event data to replicate the record of the replication target table of the producer instance onto the consumer instance.

2. The computer system according to claim 1, comprising computer instructions that, when executed by the one or more processing units, cause the computer system to:
   subscribe the consumer instance to the replication set by setting the consumer replication configuration data, the consumer replication configuration data including one or more of the replication set ID, the producer instance ID, and the shared key; and
   transmit instructions to activate the replication set at the consumer instance to configure instance data replication between the producer and consumer instances and transmit data of the replication target table from the producer instance to the consumer instance.

3. The computer system according to claim 2, wherein the computer instructions that, when executed by the one or more processing units, cause the computer system to transmit the instructions to activate the replication set at the consumer instance to configure instance data replication comprise instructions that when executed by the one or more processing units cause the computer system to bootstrap data of a plurality of records of the replication target table of the producer instance to the replication destination table of the consumer instance.

4. The computer system according to claim 1, comprising computer instructions that, when executed by the one or more processing units, cause the computer system to:
   indicate, at the producer instance, an instance ID of one or more consumer instances that have subscribed to the replication set; and
   receive indication, from each of the one or more consumer instances, of information of one or more tables including the replication target table of the producer instance that are included in the replication set.

5. The computer system according to claim 2, wherein the instance data replication is a read-only, one-way replication of data included in the replication set from the producer instance to the consumer instance.

6. The computer system according to claim 1, comprising computer instructions that, when executed by the one or more processing units, cause the computer system to:
   encrypt the replication event data placed on the outbound replication queue using the shared key; and
   transport the encrypted replication event data to the logging infrastructure for replication in response to dynamically stitching the replication event data;
   wherein, the replication event data is decrypted at the consumer instance using the shared key, and wherein the record is loaded onto the replication destination table of the consumer instance based on the decrypted replication event data.

7. The computer system according to claim 1, wherein the data modification event is one or more of an insert, update, and delete event associated with the record of the replication target table.

8. The computer system according to claim 1, wherein the logging infrastructure is a publish/subscribe-model messaging platform.

9. A method for replicating instance data, comprising:
   activating, with one or more processors, a replication set at a producer instance by setting producer replication configuration data, wherein the replication set includes a replication target table, and wherein the producer replication configuration data comprises a producer instance ID, a replication set ID, a shared key for encrypting/decrypting the data of the replication target table, horizontal filter criteria for replicating data of the replication target table, and vertical filter criteria for replicating data of the replication target table;
   receiving, with the one or more processors from a consumer instance, a subscription request to subscribe to the replication set of the producer instance;
   detecting, with the one or more processors and based on the producer replication configuration data of the producer instance, a data modification event associated with a record of the replication target table included in the replication set of the producer instance;
   generating, with the one or more processors, replication event data of the data modification event when the data modification event is determined to be eligible for replication based on predetermined criteria included in the producer replication configuration data;
   placing, with the one or more processors, the replication event data in an outbound replication queue to transport the replication event data to a logging infrastructure for replication; and transmitting, with the one or more processors, to the consumer instance subscribing to the replication set of the producer instance, the replication event data from the logging infrastructure based on consumer replication configuration data of the consumer instance, wherein the consumer instance is configured to load a record onto a replication destination table of the consumer instance based on the replication event data to replicate the record of the replication target table of the producer instance onto the consumer instance.

10. The method according to claim 9, comprising:
subscribing, with the one or more processors, the consumer instance to the replication set by setting the consumer replication configuration data, the consumer replication configuration data including one or more of the replication set ID, the producer instance ID, and the shared key; and
transmitting instructions to activate, with the one or more processors, the replication set at the consumer instance to configure instance data replication between the producer and consumer instances and transmit data of the replication target table from the producer instance to the consumer instance.

11. The method according to claim 10, wherein transmitting the instructions to activate the replication set at the consumer instance to configure instance data replication comprises bootstrapping, with the one or more processors, data of a plurality of records of the replication target table of the producer instance to the replication destination table of the consumer instance.

12. The method according to claim 9, comprising:
indicating, with the one or more processors and at the producer instance, an instance ID of one or more consumer instances that have subscribed to the replication set; and
receiving, with the one or more processors, indication from each of the one or more consumer instances, information of one or more tables including the replication target table of the producer instance that are included in the replication set.

13. The method according to claim 10, wherein the instance data replication is a read-only, one-way replication of data included in the replication set from the producer instance to the consumer instance.

14. The method according to claim 9, comprising:
encrypting, with the one or more processors, the replication event data placed on the outbound replication queue using the shared key; and
transporting, with the one or more processors, the encrypted replication event data to the logging infrastructure for replication in response to dynamically stitching the replication event data;
wherein the replication event data is decrypted at the consumer instance using the shared key, and wherein the record is loaded onto the replication destination table of the consumer instance based on the decrypted replication event data.

15. The method according to claim 9, wherein the data modification event is one or more of an insert, update, and delete event associated with the record of the replication target table.

16. The method according to claim 9, wherein the logging infrastructure is a publish/subscribe-model messaging platform.

17. A non-transitory computer readable recording medium having stored thereon a program for replicating instance data, comprising computer executable instructions that when executed by one or more processing units cause the one or more processing units to:
activate a replication set at a producer instance by setting producer replication configuration data, wherein the replication set includes a replication target table, and wherein the producer replication configuration data comprises a producer instance ID, a replication set ID, a shared key for encrypting/decrypting the data of the replication target table, horizontal filter criteria for replicating data of the replication target table, and vertical filter criteria for replicating data of the replication target table;
receive, from a consumer instance, a subscription request to subscribe to the replication set of the producer instance;
detect, based on the producer replication configuration data of the producer instance, a data modification event associated with a record of the replication target table included in the replication set of the producer instance;
generate replication event data of the data modification event when the data modification event is determined to be eligible for replication based on predetermined criteria included in the producer replication configuration data;
place the replication event data in an outbound replication queue to transport the replication event data to a logging infrastructure for replication; and
transmit, to the consumer instance subscribing to the replication set of the producer instance, the replication event data from the logging infrastructure based on consumer replication configuration data of the consumer instance, wherein the consumer instance is configured to load a record onto a replication destination table of the consumer instance based on the replication event data to replicate the record of the replication target table of the producer instance onto the consumer instance.

18. The non-transitory computer readable medium according to claim 17, wherein the instructions cause the one or more processing units to:
subscribe the consumer instance to the replication set by setting the consumer replication configuration data, the consumer replication configuration data including one or more of the replication set ID, the producer instance ID, and the shared key; and
transmit instructions to activate the replication set at the consumer instance to configure instance data replication between the producer and consumer instances and transmit data of the replication target table from the producer instance to the consumer instance.

19. The non-transitory computer readable medium according to claim 18, wherein the instructions that cause the one or more processing units to transmit instructions to activate the replication set at the consumer instance to configure instance data replication comprise instructions that cause the one or more processing units to bootstrap data of a plurality of records of the replication target table of the producer instance to the replication destination table of the consumer instance.

20. The non-transitory computer readable medium according to claim 17, comprising instructions that cause the one or more processing units to:
indicate, at the producer instance, an instance ID of one or more consumer instances that have subscribed to the replication set; and receive indication, from each of the one or more consumer instances, of information of one or more tables including the replication target table of the producer instance that are included in the replication set.

* * * * *